(12) United States Patent
Zhang

(10) Patent No.: US 11,334,652 B2
(45) Date of Patent: May 17, 2022

(54) FINGERPRINT IDENTIFICATION METHOD, DEVICE, MOBILE TERMINAL, AND STORAGE MEDIUM

(71) Applicant: GUANGDONG OPPO MOBILE TELECOMMUNICATIONS CORP., LTD., Guangdong (CN)

(72) Inventor: Zhichao Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 178 days.

(21) Appl. No.: 16/627,701

(22) PCT Filed: Sep. 7, 2018

(86) PCT No.: PCT/CN2018/104526
§ 371 (c)(1),
(2) Date: Dec. 30, 2019

(87) PCT Pub. No.: WO2019/047908
PCT Pub. Date: Mar. 14, 2019

(65) Prior Publication Data
US 2020/0167451 A1     May 28, 2020

(30) Foreign Application Priority Data

Sep. 7, 2017 (CN) .......................... 201710800536.5

(51) Int. Cl.
*G06F 21/32* (2013.01)
*G06F 9/451* (2018.01)
(Continued)

(52) U.S. Cl.
CPC ............ *G06F 21/32* (2013.01); *G06F 3/0412* (2013.01); *G06F 3/04817* (2013.01);
(Continued)

(58) Field of Classification Search
CPC ...... G06F 21/32; G06F 21/316; G06F 3/0412; G06F 3/04817; G06F 9/451;
(Continued)

(56) References Cited

U.S. PATENT DOCUMENTS

2006/0210126 A1* 9/2006 Cho .......................... G07C 9/37
382/124
2009/0083850 A1* 3/2009 Fadell ..................... G06F 21/36
726/19
(Continued)

FOREIGN PATENT DOCUMENTS

CN        103425914 A     12/2013
CN        103942481 A     7/2014
(Continued)

OTHER PUBLICATIONS

English translation of the first office action issued in corresponding CN Application No. 201710800536.5 dated Aug. 10, 2018.
(Continued)

*Primary Examiner* — Justin R. Blaufeld
(74) *Attorney, Agent, or Firm* — Young Basile Hanlon & MacFarlane, P.C.

(57) ABSTRACT

A fingerprint identification method, a device, a mobile terminal, and a storage medium, belong to the technical field of information processing technology. The method is applied to a terminal, response to detecting a touch operation on a specified application icon, obtaining fingerprint information corresponding to the touch operation; transmitting the fingerprint information to an application corresponding to the specified application icon; the application performing a safety authentication to the fingerprint information; and response to determining that the fingerprint information passes the safety authentication, the application entering an application display interface.

12 Claims, 10 Drawing Sheets

```
┌─────────────────────────────────────────────────────────┐
│ response to detecting a touch operation on a specified  │  201
│ application icon, obtaining fingerprint information     │
│ corresponding to the touch operation                    │
└─────────────────────────────────────────────────────────┘
                          │
                          ▼
┌─────────────────────────────────────────────────────────┐
│ transmitting the fingerprint information to an          │  202
│ application corresponding to the specified application  │
│ icon; the application performing a safety               │
│ authentication to the fingerprint information           │
└─────────────────────────────────────────────────────────┘
                          │
                          ▼
┌─────────────────────────────────────────────────────────┐
│ if the fingerprint information passes the safety        │  203
│ authentication, the application enters the application  │
│ display interface                                       │
└─────────────────────────────────────────────────────────┘
```

(51) Int. Cl.

| | |
|---|---|
| *G06F 3/04817* | (2022.01) |
| *G06F 3/041* | (2006.01) |
| *G06F 21/31* | (2013.01) |
| *H04M 1/72463* | (2021.01) |
| *H04M 1/72469* | (2021.01) |
| *G06V 40/13* | (2022.01) |

(52) U.S. Cl.
CPC ............ *G06F 9/451* (2018.02); *G06F 21/316* (2013.01); *G06V 40/13* (2022.01); *H04M 1/72463* (2021.01); *H04M 1/72469* (2021.01); *G06V 40/1306* (2022.01); *G06V 40/1318* (2022.01)

(58) Field of Classification Search
CPC .......... H04M 1/72463; H04M 1/72469; G06K 9/00013; G06K 9/0004; G06K 9/0002; G06V 40/13; G06V 40/1306; G06V 40/1318
See application file for complete search history.

(56) References Cited

U.S. PATENT DOCUMENTS

| | | | |
|---|---|---|---|
| 2010/0240415 A1* | 9/2010 | Kim ........................ | G06F 21/32 455/565 |
| 2014/0283142 A1* | 9/2014 | Shepherd .............. | G06F 3/0488 726/30 |
| 2014/0292666 A1 | 10/2014 | Shi et al. | |
| 2014/0344954 A1* | 11/2014 | Kim ...................... | G06F 3/0482 726/28 |
| 2015/0153911 A1* | 6/2015 | Seymour ............... | G06F 3/0488 715/765 |
| 2015/0294101 A1* | 10/2015 | Wen ..................... | H04W 12/065 726/28 |
| 2017/0308732 A1* | 10/2017 | Wang ................... | G06F 3/0488 |
| 2018/0203986 A1* | 7/2018 | Huang .................. | H04L 9/3231 |
| 2018/0247065 A1* | 8/2018 | Rhee ....................... | H04M 1/67 |
| 2019/0230212 A1* | 7/2019 | Spracklin .......... | H04M 1/72463 |
| 2019/0340343 A1* | 11/2019 | Li ........................ | G06F 3/0481 |
| 2019/0347395 A1* | 11/2019 | Chao .................... | H04M 1/026 |
| 2020/0089857 A1* | 3/2020 | Xu ...................... | G06V 40/1365 |

FOREIGN PATENT DOCUMENTS

| | | |
|---|---|---|
| CN | 104008319 A | 8/2014 |
| CN | 104463082 A | 3/2015 |
| CN | 104516716 A | 4/2015 |
| CN | 104866750 A | 8/2015 |
| CN | 105335053 A | 2/2016 |
| CN | 105488464 A | 4/2016 |
| CN | 105677337 A | 6/2016 |
| CN | 106020418 A | 10/2016 |
| CN | 106022057 A | 10/2016 |
| CN | 106355075 A | 1/2017 |
| CN | 106372485 A | 2/2017 |
| CN | 106502406 A | 3/2017 |
| CN | 106502544 A | 3/2017 |
| CN | 106815508 A | 6/2017 |
| CN | 107609372 A | 1/2018 |
| EP | 3193247 A1 | 7/2017 |
| JP | 5606705 B2 | 10/2014 |
| WO | WO-2016037318 A1 * | 3/2016 ............. G06F 21/32 |

OTHER PUBLICATIONS

English translation of the second office action issued in corresponding CN Application No. 201710800536.5 dated Dec. 4, 2018.
English translation of the Rejection issued in corresponding CN Application No. 201710800536.5 dated Mar. 13, 2019.
European Search Report issued in corresponding European Application No. 18854362.3 dated Feb. 28, 2020.
International search report issued in corresponding international application No. PCT/CN2018/104526 dated Nov. 22, 2018.

* cited by examiner

FINGERPRINT IDENTIFICATION METHOD, DEVICE, MOBILE TERMINAL, AND STORAGE MEDIUM

CROSS REFERENCE TO RELATED APPLICATIONS

The present application claims is a national stage application, and claims priority to the International Application No. PCT/CN2018/104526, filed on Sep. 7, 2018, and also claims priority to the Chinese Application No. CN 201710800536.5, filed on Sep. 7, 2017, titled "fingerprint identification method, device, mobile terminal, and storage medium". Afore-mentioned references are herein incorporated by reference in their entireties.

TECHNICAL FIELD

The present disclosure relates to the field of information processing technology, particularly a fingerprint identification method, a device, a mobile terminal, and a storage medium.

BACKGROUND

With the rapid development of information processing technologies, fingerprint identification technologies are widely applied to terminals. For example, fingerprint identification technologies are not only used in payment, logging in, unlocking, but also are applied to encryption and decryption.

Within relevant technologies, when an encrypted application needs to be decrypted, a user may click on the application icon, and the terminal, based on detecting a clicking operation on the application icon, displays hints for fingerprint decryption. For example, the fingerprint decryption hint may be "please enter the fingerprint". Then, the user needs to input the fingerprint at a specified location (for example, the specified location is the location of HOME key) of the terminal, so the terminal can collect the fingerprint and decrypt the application by fingerprint identification.

SUMMARY

Various embodiments of the present disclosure provide a fingerprint identification method, a device, a mobile terminal, and a storage medium, which may be used to solve the technical problem of low efficiency in fingerprint identification. The present disclosure provides the following technical solution:

According to one aspect, a fingerprint identification method, applied to a terminal, is provided. The method includes:

response to detecting a touch operation on a specified application icon, obtaining fingerprint information corresponding to the touch operation;

transmitting the fingerprint information to an application corresponding to the specified application icon;

the application performing a safety authentication to the fingerprint information; and response to determining that the fingerprint information passes the safety authentication, the application entering an application display interface.

According to another aspect, a fingerprint identification device is provided within a terminal. The device includes:

an obtaining module configured to, response to detecting a touch operation on a specified application icon, obtain a fingerprint information corresponding to the touch operation;

a transmitting module configured to transmit the fingerprint information to an application corresponding to the specified application icon;

the application performing a safety authentication based on the fingerprint information;

response to determining that the fingerprint information passes the safety authentication, the application entering an application display interface.

According to another aspect, a mobile terminal, including a storage medium, a processor, and computer instructions stored in the storage medium and executable by the processor is provided. The processor is configured to perform according to any of the aspects of the fingerprint identification method.

According to another aspect, a computer-readable storage medium is provided. The computer-readable storage medium storing instructions, when executed by a computer, cause the computer to perform according to any of the aspects of the fingerprint identification method.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

For a better understanding of the aforementioned embodiments of the invention as well as additional embodiments thereof, reference should be made to the Detailed Description of the Embodiments below, in conjunction with the following drawings in which like reference numerals refer to corresponding parts throughout the figures.

DETAILED DESCRIPTION OF THE EMBODIMENTS

Figure 1:
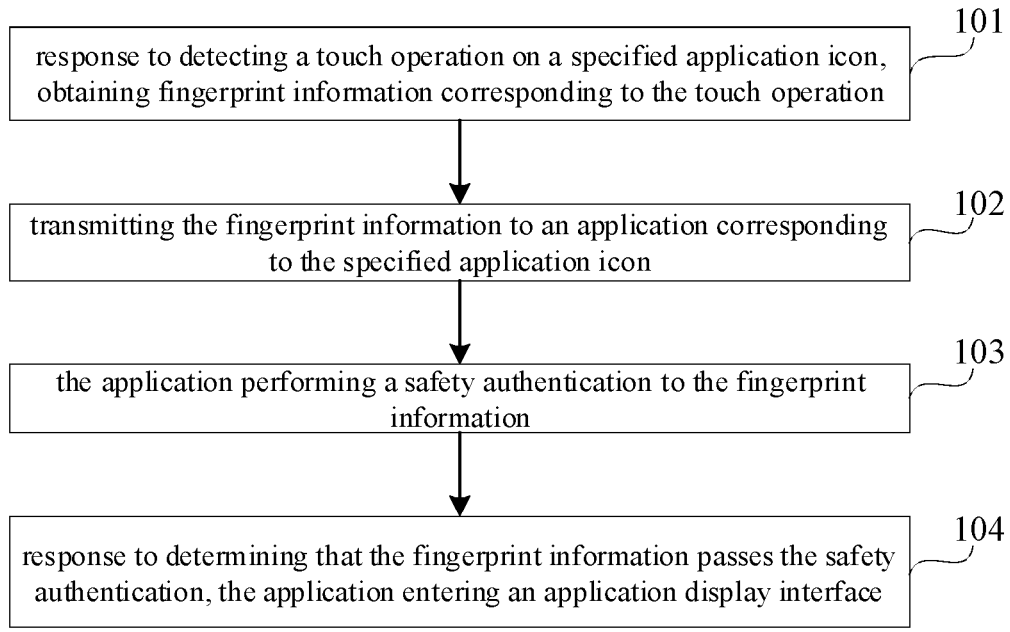
FIG. 1 is a schematic flowchart of a fingerprint identification method according to one embodiment of the present disclosure.

The present disclosure will be described in details in combination with the accompanying drawings and embodiments such that the purpose, technical solution and advantages of the present disclosure will be more apparent. It should be understood that the particular embodiments are described for the purpose of illustrating as opposed to restricting the present disclosure.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not be described in details so as not to unnecessarily obscure aspects of the embodiments.

Before describing the detailed embodiments of the present disclosure, terms, implementation environments, and performance main bodies are briefly introduced below:

First, terms related in various embodiments are briefly introduced.

Fingerprint sensor: can be used to implement fingerprint collection.

Fingerprint collection component: usually integrated by one or more fingerprint sensors. Each fingerprint sensor can be considered as a fingerprint collection unit in the fingerprint collection component.

Next, the implementation environments involved in the embodiments of the present disclosure are briefly introduced.

Currently, multiple applications are usually installed in the terminal. In order to increase the security in using, some applications support encryption operations. For example, the applications include but are not limited to instant messaging applications and social applications. As such, when the application is launched, the application needs to be decrypted. In order to improve the convenience of operation, the fingerprint identification technology can be used to decrypt the encrypted application. However, the method for decrypting an application by using fingerprint identification technology provided by related technologies is relatively inefficient. For this reason, the embodiments of the present disclosure provide a fingerprint identification method, which can quickly and effectively perform decryption on an encrypted application.

Next, the performance main bodies involved in the embodiments of the present application are briefly introduced.

The fingerprint identification method involved in the embodiments of the present disclosure may be executed by a terminal, which is provided with a display screen. And one or more fingerprint sensors are provided below the display screen of the terminal, and the one or more fingerprint sensors are integrated with the fingerprint collection component. The fingerprint collection component may perform fingerprint collection on all areas of the display screen through the one or more fingerprint sensors. That is, the one or more fingerprint sensors are integrated in all areas of the display screen.

In addition, multiple applications can be installed and run in this terminal. In the actual implementation process, the multiple applications are encrypted. In use, they need to be decrypted before they can be used. Further, the terminal can decrypt the encrypted application by means of fingerprint identification. For specific implementation, refer to the embodiments shown in FIG. 1 and FIG. 2 below.

It is noted that, in actual implementations, the terminal may be a mobile phone, a tablet computer, a computer, etc. The various embodiments of the present disclosure do not limit the actual form or structure of the terminal as long as it is consistent with the detailed description of the embodiments.

After the terms, implementation environments, and performance main bodies are briefly introduced, below the detailed embodiments of the present disclosure are described with reference to accompanying drawings.

Referring to FIG. 1, in various embodiments of the present disclosure, a fingerprint identification method is provided. The fingerprint identification method is performed by the terminal. The fingerprint identification method includes the following steps:

At 101: response to detecting a touch operation on a specified application icon, obtaining fingerprint information corresponding to the touch operation.

At 102: transmitting the fingerprint information to an application corresponding to the specified application icon.

At 103: the application performing a safety authentication to the fingerprint information.

At 104: response to determining that the fingerprint information passes the safety authentication, the application entering an application display interface.

In some embodiments, if a touch operation is detected in the specified application icon, it means that the application needs to be decrypted. Then, the fingerprint information corresponding to the touch operation is obtained, and the fingerprint information is transmitted to the application. After receiving the fingerprint information, the application performs safety authentication on the fingerprint information. If the fingerprint information passes the safety authentication, it means that the fingerprint information is secure. At this time, the application starts and enters the application display interface. In this way, the decryption efficiency of the application is improved.

Optionally, performing the safety authentication to the fingerprint information includes:

response to determining that the fingerprint information matches a pre-stored valid fingerprint information, the application determines that the fingerprint information passes the safety authentication;

response to determining that the fingerprint information does not match a pre-stored valid fingerprint information, the application determines that the fingerprint information does not pass the safety authentication.

Optionally, after the application determines that the fingerprint information does not pass the safety authentication, further including:

the application shaking the specified application icon at a preset frequency, and displaying a fingerprint entry prompt message on the specified application icon, the fingerprint entry prompt message being configured to notify a user to re-enter the fingerprint information.

Optionally, after the application determines that the fingerprint information does not pass the safety authentication, further including:

the application calculates the authentication failure times, the authentication failure times being a number of consecutive fingerprint authentication failures;

response to the application determining that the authentication failure times reach a preset count, blocking the specified application icon.

Optionally, after the response to the application determining that the authentication failure times reach a preset count, blocking the specified application icon, further including:

response to the application detecting a screen unlock command again, restoring displaying the specified application icon.

Optionally, a fingerprint sensor is provided below a display screen of the terminal. The obtaining fingerprint information corresponding to the touch operation includes:

launching the fingerprint sensor at the icon display area of the specified application icon;

obtaining, by the fingerprint sensor, the fingerprint information corresponding to the touch operation.

Optionally, the response to detecting a touch operation on a specified application icon, obtaining fingerprint information corresponding to the touch operation includes:

displaying a switch entry on a user interface of a foreground application, the switch entry being configured to, upon being triggered, switch the user interface of the foreground application to a user interface of a target application;

response to detecting the touch operation on the switch entry, obtaining the fingerprint information corresponding to the touch operation.

Optionally, response to detecting a touch operation on a specified application icon, obtaining fingerprint information corresponding to the touch operation includes:

response to receiving a notification message, displaying a message display controller, the message display controller being configured to display a content of the notification message;

response to detecting the touch operation on the message display controller, obtaining the fingerprint information corresponding to the touch operation.

Optionally, response to receiving the notification message, displaying the message display controller includes:

response to receiving the notification message and the terminal being in a state of screen on and locked, displaying the message display controller in the locked user interface; or, response to receiving the notification message and the terminal being in a state of full-screen displaying a user interface of a foreground application, determining the message display controller is a pop message, and displaying the pop message; or, upon receiving the notification message, displaying the message display controller in the notification bar; or, upon receiving the notification message, displaying the message display controller on a negative screen, the negative screen being a user interface accommodating the specified system controller in at least one desktop interface of the terminal.

Optionally, response to detecting a touch operation on a specified application icon, obtaining fingerprint information corresponding to the touch operation includes:

displaying a specified operation icon, the specified operation icon being configured to, upon being triggered, instruct the terminal to perform a specified operation, the specified operation icon corresponding to the specified operation, the specified operation being a function of an application corresponding to the specified application icon;

response to detecting the touch operation on the specified operation icon, obtaining the fingerprint information corresponding to the touch operation.

Optionally, displaying the specified operation icon includes:

displaying the specified operation icon in a desktop interface of the terminal; or, displaying the specified operation icon in a notification bar of the terminal; or, displaying the specified operation icon in a navigation bar of the terminal.

Optionally, the method includes:

when the terminal is in a state of screen on and locked, displaying the specified application icon in a user interface;

performing the step of responding to detecting the touch operation on the specified application icon, obtaining fingerprint information corresponding to the touch operation.

Above-discussed embodiments may be combined or organized to form optional embodiments of the present disclosure.

Figure 2:
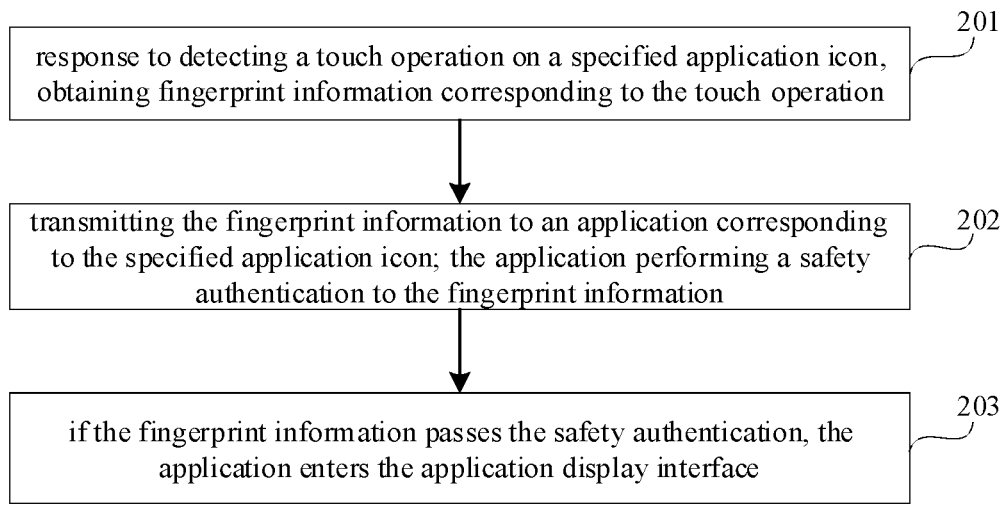
FIG. 2 is a schematic flowchart of a fingerprint identification method according to one embodiment of the present disclosure.

Referring to FIG. 2, the present disclosure provides a fingerprint identification method. The fingerprint identification method is performed by the terminal. The fingerprint identification method includes the following steps:

At 201: response to detecting a touch operation on a specified application icon, obtaining fingerprint information corresponding to the touch operation.

As discussed before, in optional implementation environments, the terminal is installed with several applications. These applications are encrypted and need to be decrypted to be used. The specified application icon refers to application icons of encrypted applications.

Figure 3:
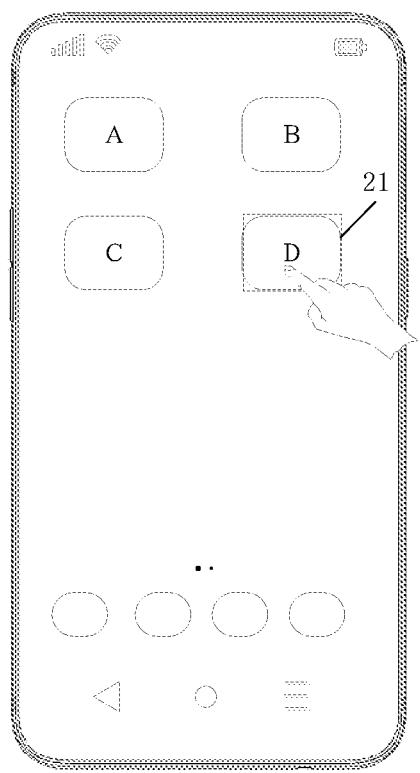
FIG. 3 is a schematic view of the interface of a display screen according to one embodiment of the present disclosure.

For example, referring to FIG. 3, an application A, an application B, an application C, and an application D are installed in the terminal. Assuming that the application D is an encrypted application. When the user needs to start the application D, the user can click the application icon of the application D. Accordingly, when the terminal detects a touch operation based on the application icon of the application D, the fingerprint information corresponding to the touch operation is obtained.

Further, a fingerprint sensor is provided below the display screen of the terminal. Accordingly, an optional implementation of obtaining fingerprint information corresponding to the touch operation may include: starting the fingerprint sensor at an icon display area of the standardized application icon, the fingerprint sensor obtains the fingerprint information corresponding to the touch operation.

As mentioned above, since one or more fingerprint sensors can be set under the display of the terminal, the terminal can collect fingerprints on any area of the display. In order to save power consumption, here, the terminal can activate only the fingerprint sensors in the icon display area of the specified application icon. That is, the terminal determines the icon display area of the specified application icon, and then starts the fingerprint sensors at the icon display area.

For example, as shown in FIG. 3, the icon display area of the specified application icon is area 21.

Optionally, when multiple fingerprint sensors are provided below the display screen of the terminal, optional implementations of starting the fingerprint sensors in the icon display area of the specified application icon may include: starting a number N of fingerprint sensors in the icon display area of the specified application icon. Where N is an integer greater than 1. Further, the relationship between the area occupied by the N fingerprint sensors and the icon display area may include the following possible situations:

The first case: the area occupied by the N fingerprint sensors is equal to the icon display area.

Under normal circumstances, the area of the icon display area of the specified application icon can be considered to be sufficient to collect the user's fingerprint information. Therefore, in this implementation, the terminal can only start N fingerprint sensors in the icon display area, i.e., the area occupied by the N fingerprint sensors is equal to the icon display area.

The second case: the area occupied by the N fingerprint sensors is larger than the icon display area.

In this case, in order to further improve the accuracy of fingerprint collection, the fingerprint collection area can be increased. Therefore, a larger area can be determined here, and the corresponding N fingerprint sensors in the determined area are activated, i.e., the area occupied by the N fingerprint sensors is larger than the icon display area.

After the terminal starts the fingerprint sensor, the fingerprint sensor can be used to collect user fingerprint information. For example, the fingerprint information may be a fingerprint image.

In a possible implementation manner, the terminal may also: (1) display the switch entry in the user interface of the foreground application; (2) when a touch operation is detected in the switch entry, obtain fingerprint information corresponding to the touch operation. Particularly, the switch entry is used to switch the user interface of the foreground application to the user interface of the target application when triggered. For example, the foreground application of the terminal is application A, and the user interface of the application A displays the switch entry of "jump to application B". When the user's finger clicks the switch entry, i.e., the user's finger generates a touch on the switch entry operation, the terminal collects the fingerprint information corresponding to the touch operation.

In another possible implementation manner, the terminal may also: (1) when receiving a notification message, the terminal displays a message display controller; (2) when a touch operation is detected on the message display controller, the terminal obtains the fingerprint information corresponding to the touch operation. The message display controller is used to display the content of the notification message. For example, if the terminal receives a notification message corresponding to the application A, the terminal will display a message display controller, and display the content of the notification message through the message display controller. The terminal can obtain the fingerprint information corresponding to the touch operation when the message display controller detects the touch operation. For example, the user's finger clicks on the message display controller.

In another possible implementation manner, when the terminal receives a notification message, it can also display a message display controller in the following ways.

In a possible display manner of the message display controller, when a notification message is received and the terminal is in a state where the screen is on and locked, the terminal can display the message display controller in the user interface of the lock screen. For example, when the terminal is locked and the screen is on, after receiving a notification message, the terminal can display a message display controller in the user interface of the lock screen.

In another possible display mode of the message display controller, when a notification message is received and the terminal displays the user interface of the foreground application in full screen, the terminal determines the message display controller as the pop message and displays the pop message.

In another possible display mode of the message display controller, when a notification message is received, the terminal will display the message display controller in the notification bar. For example, the message display controller may be rectangular and the length is the width of the screen of the terminal, and the width is less than the length.

In another possible display mode of the message display controller, when a notification message is received, the terminal can display the message display controller on a negative screen. The negative screen is a user interface accommodating the specified system controller in at least one desktop interface of the terminal. For example, the terminal can display the message display controller at a specified position on the negative screen.

In another possible implementation manner, the terminal may (1) display a specified operation icon; (2) when a touch operation is detected on the specified operation icon, obtain fingerprint information corresponding to the touch operation. Particularly, the specified operation corresponds to the specified operation icon, and the specified operation is a function in the application corresponding to the specified application icon. For example, if the application corresponding to the specified application icon is a contact application, the specified operation may be at least one of "new contact", "common contact", "scan business card", and "my business card".

It should be noted that the terminal can display the specified operation icon in the following display modes. In one possible display mode, the terminal can display the specified operation icon in the desktop interface. In another possible display mode, the terminal can also display the specified operation icon in the notification bar. In another possible display mode, the terminal can also display the specified operation icon in the navigation bar. Particularly, the specified operation icon displayed in the desktop interface may be a startup icon shaped like an application, and a specified application icon is displayed at a corner of the specified operation icon. The specified operation icon displayed in the notification bar can be a shortcut entry to a specified operation. For example, it may be a function of scanning the graphic code of the payment application B.

In another method of collecting fingerprint information corresponding to a touch operation by a terminal, when the terminal is in a state where the screen is on and locked, a specified application icon is displayed in the user interface, so that the user can press the icon of the specified application directly in the locked screen to unlock and open the corresponding application.

At 202: transmitting the fingerprint information to an application corresponding to the specified application icon; the application performing a safety authentication to the fingerprint information.

The terminal after obtaining the fingerprint information, may transmit the obtained fingerprint information to the application, and the application performs the safety authentication to the fingerprint information.

Specifically, the application performing safety authentication according to the fingerprint information may include the following situations:

The first case: when the fingerprint information matches the pre-stored valid fingerprint information, the application determines that the fingerprint information passes safety authentication.

In an actual implementation scenario, the terminal can collect the fingerprint information of the user in advance, and save the collected fingerprint information as complete valid fingerprint information, so as to identify the fingerprint information entered by the user based on the valid fingerprint information.

Therefore, after obtaining the fingerprint information transmitted by the terminal, the application can compare the fingerprint information with the pre-stored valid fingerprint information to determine whether the fingerprint information matches the pre-stored valid fingerprint information.

For example, if the valid fingerprint information is a valid fingerprint image, the application compares the collected fingerprint image with the valid fingerprint image to determine whether the fingerprint image matches the valid fingerprint image. If matched, it can be determined that the fingerprint information passes safety authentication.

It should be noted that, in the process of collecting and storing valid fingerprint information, a method for collecting fingerprint information of the user by the terminal may refer to related technologies, which is not limited in the embodiments of the present disclosure. For example, the terminal can collect the fingerprint information of the user through a fingerprint sensor at a specified position. For example, the specified position may be the position where the HOME button is located.

Second case: when the fingerprint information does not match the pre-stored valid fingerprint information, the application determines that the fingerprint information has not passed safety authentication.

For example, if the fingerprint information is a fingerprint image and the valid fingerprint information is a valid fingerprint image, when the fingerprint image does not match the valid fingerprint image, it is determined that the fingerprint information has not passed safety authentication.

Further, when it is determined that the fingerprint information has not passed safety authentication, the application may shake the application icon according to a preset frequency, and display a fingerprint entry prompt message on the application icon. The fingerprint entry prompt message is used to prompt the user to re-enter fingerprint information.

The preset frequency may be customized by a user according to actual requirements, or may be set by a terminal by default, which is not limited in the embodiments of the present disclosure.

Figure 4:
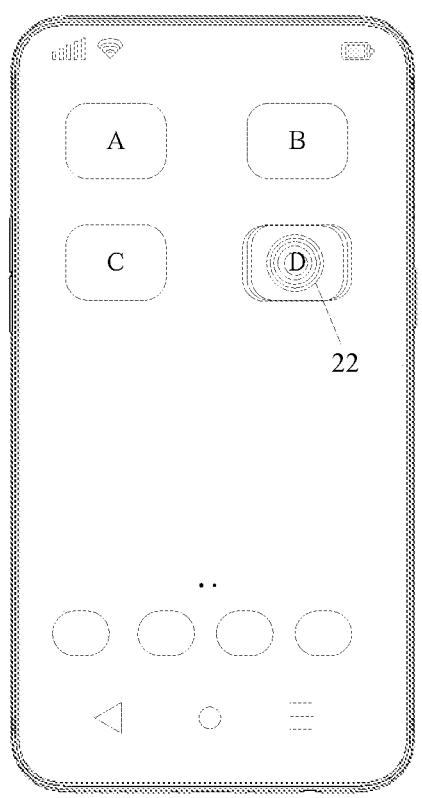
FIG. 4 is a schematic view of the interface of another display screen according to one embodiment of the present disclosure.

In order to remind the user that the fingerprint information has not passed safety authentication, the application may shake and display the specified application icon according to the preset frequency. For example, referring to the application icon of application D in FIG. 4, which is a diagram illustrating an application according to an exemplary embodiment.

It should be noted that the application is only shown as an example in which the application shakes the preset application icon according to the preset frequency. In another embodiment, the user may also be notified in other ways that the fingerprint information has not passed safety authentication. For example, while the application shakes and displays the specified application icon according to the preset frequency, the terminal may be notified to start the vibration mode to prompt the user that the fingerprint information has not passed safety authentication, which is not specifically limited in the embodiments of the present disclosure.

In an actual implementation scenario, if the fingerprint information fails the safety authentication, the user may touch the specified application icon with the wrong finger. In order to further guide the user to re-enter the fingerprint information, the terminal can also display a fingerprint entry prompt message on the specified application icon. In actual implementations, the fingerprint entry prompt message may be a fingerprint entry prompt image, as shown at 22 in FIG. 4, or the fingerprint entry prompt message may also be text information or the like.

Further, the application calculates the authentication failure times. The authentication failure times refer to a number of consecutive fingerprint authentication failures, and if the authentication failure times reach the preset count, the specified application icon is blocked.

The preset count can be customized by a user according to actual requirements, or can be set by a terminal by default, which is not limited in the embodiments of the present disclosure.

In an actual application scenario, if the user has repeatedly touched the specified application icon and the fingerprint information has not passed safety authentication, this indicates that the user may not have permission to use the application. Therefore, in order to improve the security of use, the application can count the number of consecutive fingerprint authentication failures, that is, statistics of authentication failure times. Once the detected authentication failure times reach the preset count, the specified application icon can be blocked so that the application enters a locked state. Consequently, even if the user touches the application, it will not get a response.

Figure 5:
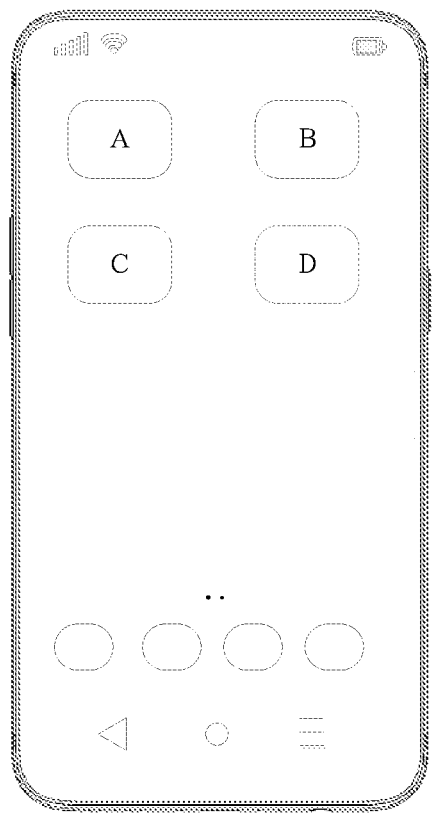
FIG. 5 is a schematic view of the interface of another display screen according to one embodiment of the present disclosure.

Further, if the authentication failure times reach the preset count, the specified application icon may also be displayed in a semi-transparent manner. For example, referring to FIG. 5, which shows a schematic view of the display effect of the application D after being blocked. Here, a dotted line is used to indicate that the terminal displays the specified application icon in a semi-transparent manner.

Further, when the application detects the screen unlock command again, the specified application icon is restored to be displayed.

After controlling the application to enter the locked state, in order to continue to perform the decryption operation on the application, the user can lock the screen of the terminal, and then unlock the screen of the terminal. Correspondingly, when the terminal detects the screen unlock operation again, it can pass a screen unlock command to the application. After receiving the screen unlock command, the application resumes displaying the specified application icon. For example, it returns to the state shown in FIG. 3, i.e., the specified application icon enters a clickable touch state. If the user still needs to decrypt the application, the user needs to perform fingerprint authentication again.

Further, after the application resumes displaying the specified application icon, the above-mentioned authentication failure times can be cleared, so that the authentication failure times can be re-stated later.

At 203: if the fingerprint information passes the safety authentication, the application enters the application display interface.

After it is determined that the fingerprint authentication passes, the application can be started, i.e., the application enters the application display interface, so that the user can further operate the application.

In the embodiments of the present disclosure, when a touch operation is detected on the specified application icon, it indicates that the application needs to be decrypted. To do this, the fingerprint information corresponding to the touch operation is obtained, and the fingerprint information is transmitted to the application. After receiving the fingerprint information, the application performs safety authentication on the fingerprint information. If the fingerprint information passes the safety authentication, it means that the fingerprint information is secure. At this time, the application starts and enters the application display interface. In this way, the decryption efficiency of the application is improved.

Figure 6:
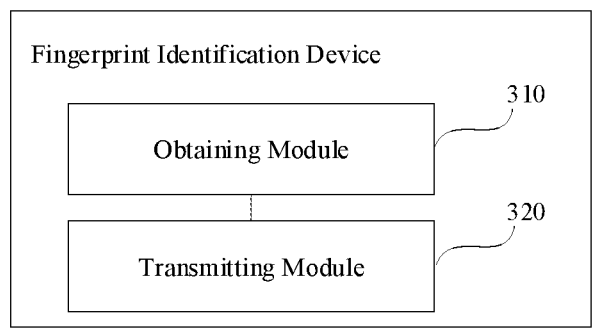
FIG. 6 is a schematic structural view of a fingerprint identification device according to one embodiment of the present disclosure.

Referring to FIG. 6, a fingerprint identification device is provided. The fingerprint identification device may be implemented by software, hardware, or combined. The fingerprint identification device includes:

an obtaining module 310, configured to, response to detecting a touch operation on a specified application icon, obtain a fingerprint information corresponding to the touch operation;

a transmitting module 320, configured to transmit the fingerprint information to an application corresponding to the specified application icon;

the application performing a safety authentication based on the fingerprint information;

response to determining that the fingerprint information passes the safety authentication, the application entering an application display interface.

Optionally, the application performing a safety authentication based on the fingerprint information includes:

response to determining that the fingerprint information matches a pre-stored valid fingerprint information, the application determines that the fingerprint information passes the safety authentication;

response to determining that the fingerprint information does not match a pre-stored valid fingerprint information, the application determines that the fingerprint information does not pass the safety authentication.

Optionally, after the application determines that the fingerprint information does not pass the safety authentication, further including:

the application shaking the specified application icon at a preset frequency, and displaying a fingerprint entry prompt message on the specified application icon, the fingerprint entry prompt message being configured to notify a user to re-enter the fingerprint information.

Optionally, after the application determines that the fingerprint information does not pass the safety authentication, further including:

the application calculates the authentication failure times, the authentication failure times being a number of consecutive fingerprint authentication failures;

response to the application determining that the authentication failure times reach a preset count, blocking the specified application icon.

Optionally, response to the application determining that the authentication failure times reach a preset count, blocking the specified application icon includes:

response to the application detecting a screen unlock command again, restoring displaying the specified application icon.

Optionally, a fingerprint sensor is provided below a display screen of the terminal, the obtaining module 310 is configured to:

launch the fingerprint sensor at the icon display area of the specified application icon;

obtain, by the fingerprint sensor, the fingerprint information corresponding to the touch operation.

Optionally, the obtaining module 310 is configured to display a switch entry in a user interface of a foreground application, and the switch entry is used to switch a user interface of the foreground application to a user interface of a target application when triggered. When the touch operation is detected on the switch entry, the fingerprint information corresponding to the touch operation is obtained.

Optionally, the obtaining module 310 is configured to display a message display controller when a notification message is received, and the message display controller is used to display the content of the notification message. When the touch operation is detected on the message display controller, the fingerprint information corresponding to the touch operation is obtained.

Optionally, the obtaining module 310 is configured to display the message display controller in a user interface of the locked screen when the notification message is received and the terminal is in a state of screen on and locked; or, when the notification message is received and the terminal displays the user interface of the foreground application in full screen, determining that the message display controller is a pop message and displaying the pop message; or, when the notification message is received. The message display controller is displayed in a notification bar; or, when the notification message is received, the message display controller is displayed on a negative screen, where the negative screen is a user interface accommodating the specified system controller in at least one desktop interface of the terminal.

Optionally, the obtaining module 310 is configured to display a specified operation icon. The specified operation icon, when triggered, is used to instruct the terminal to perform a specified operation. The specified operation icon corresponds to the specified operation, and the specified operation is a function in the application corresponding to the specified application icon. When the touch operation is detected on the specified operation icon, the fingerprint information corresponding to the touch operation is obtained.

Optionally, the obtaining module 310 is configured to display the specified operation icon in a desktop interface of the terminal; or, display the specified operation icon in a notification bar of the terminal; or, displays the specified operation icon in the navigation bar of the terminal.

Optionally, the device further includes a display module for displaying the specified application icon in a user interface when the terminal is in a state where the screen is lit and locked. The obtaining module 310 is configured to obtain fingerprint information corresponding to the touch operation when a touch operation is detected on the specified application icon.

In the embodiments of the present disclosure, when a touch operation is detected on the specified application icon, it indicates that the application needs to be decrypted. To do this, the fingerprint information corresponding to the touch operation is obtained and the fingerprint information is transmitted to the application. After receiving the fingerprint information, the application performs safety authentication on the fingerprint information. If the fingerprint information passes the safety authentication, it means that the fingerprint information is secure. At this time, the application starts and enters the application display interface. In this way, the decryption efficiency of the application is improved.

In the embodiments of the present disclosure, the switch entry can also be displayed in the user interface of the foreground application, and when a touch operation is detected on the switch entry, the fingerprint information corresponding to the touch operation is obtained. As such, when the terminal can switch between applications, directly collecting and verifying the user's fingerprint information, improves the efficiency of switching from foreground application to confidential applications.

In the embodiments of the present disclosure, a message display controller can be displayed when a notification message is received. When a touch operation is detected on the message display controller, fingerprint information corresponding to the touch operation can be obtained, so that the terminal can jump to encryption application through the notification message, while assuring the security of the encrypted application, improving the efficiency of opening the encrypted application.

It should be noted: when the fingerprint identification device provided in the above embodiments implements the fingerprint identification method, it is described by taking only the division of each functional module as an example. In practical implementations, the above functions may be allocated by different functional modules as required. That is, the internal structure of the device is divided into different functional modules to complete all or part of the functions described above. In addition, the fingerprint identification device provided by the foregoing embodiments belongs to the same concept as the fingerprint identification method embodiments, and its optional implementation process should be referred to the method embodiment, details of which are not described herein again.

Figure 7:
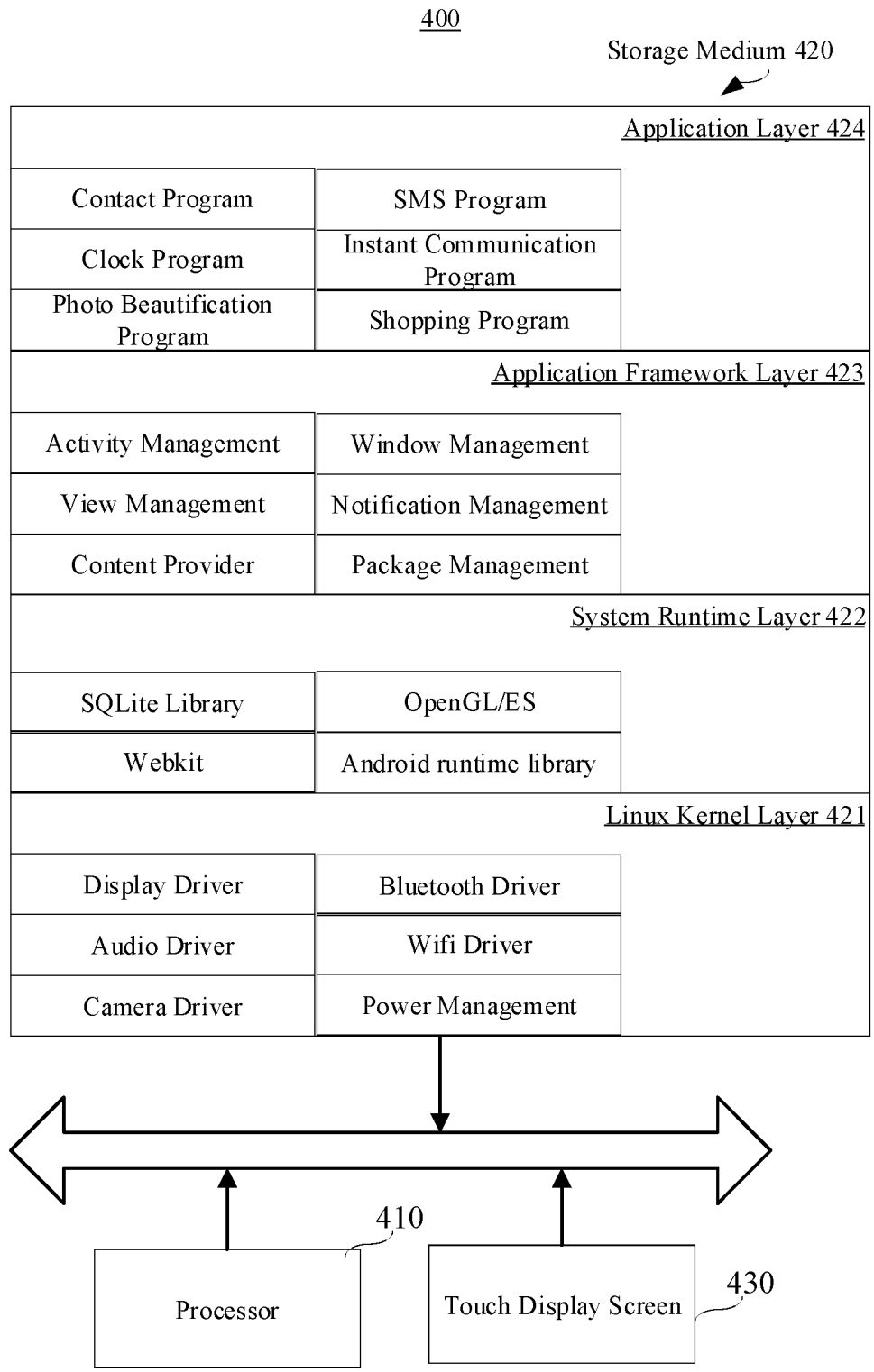
FIG. 7 is a schematic block diagram of a terminal 400 according to one embodiment of the present disclosure.
Figure 8:
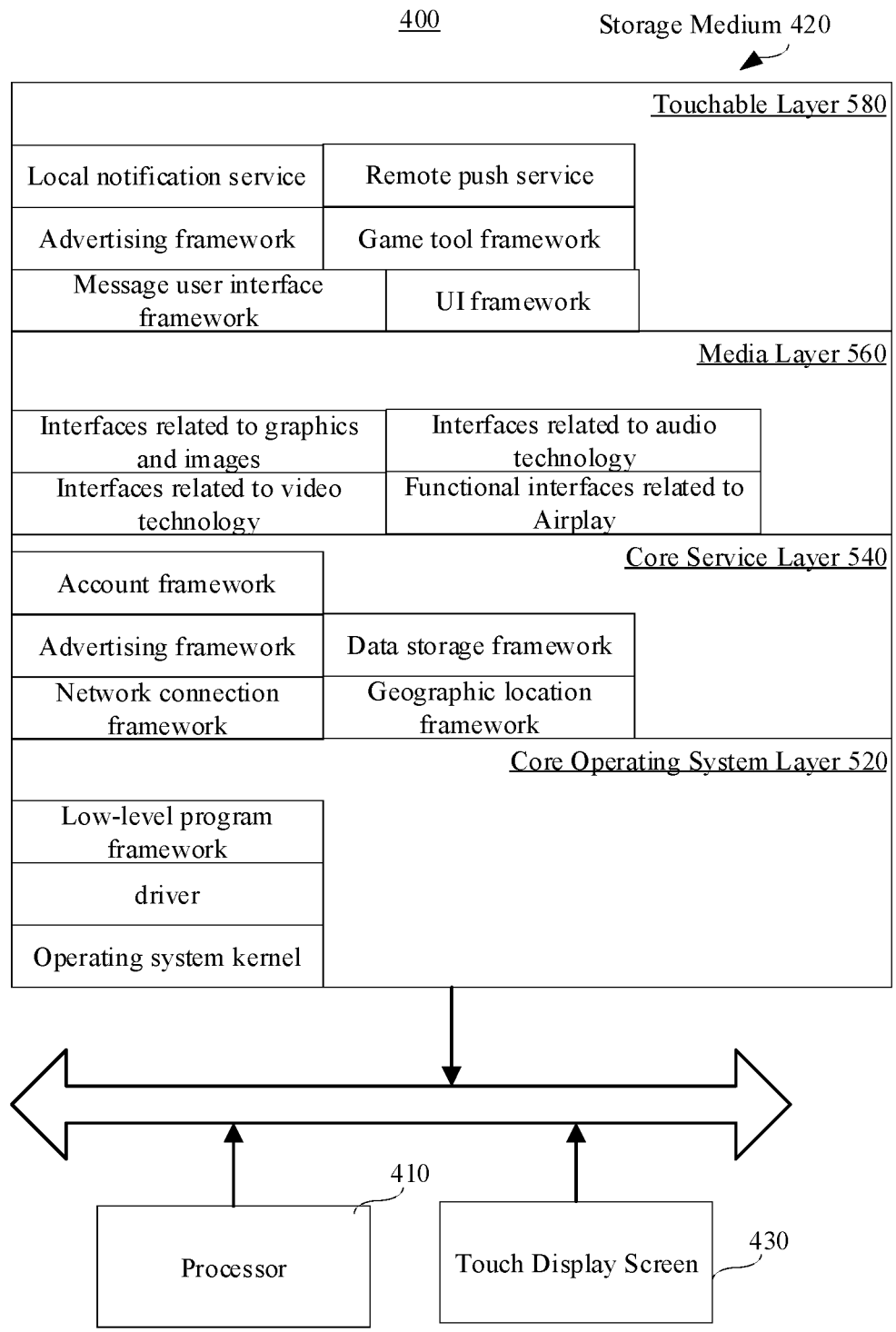
FIG. 8 is a schematic block diagram of another terminal 400 according to one embodiment of the present disclosure.

Referring to FIG. 7 and FIG. 8, a schematic block diagram of the terminal 400 according to one illustrative embodiment of the present disclosure is provided. The terminal 400 may be a mobile phone, a tablet computer, a notebook computer, or an electronic notebook. The terminal 400 of the present disclosure includes one or more components: a processor 410, a storage medium 420, and a touch display screen 430.

The processor 410 may include one or more processing cores. The processor 410 connects various parts of the entire terminal 400 by using various interfaces and lines, and executes or performs the instructions, programs, code sets, or instruction sets stored in the storage medium 420, and deploys the data stored in the storage medium 420, to execute various functions and processing data of terminal 400. Optionally, the processor 410 may use at least one hardware form of Digital Signal Processing (DSP), Field-Programmable Gate Array (FPGA), and Programmable Logic Array (PLA) to implement. The processor 410 may integrate one or a combination of a Central Processing Unit (CPU), a Graphics Processing Unit (GPU), and a modem. Particularly, the CPU mainly handles the operating system, user interface, and application programs; the GPU is responsible for rendering and drawing the content to be displayed by the touch display screen 430; and the modem is used for processing wireless communication. It can be understood that the modem may not be integrated into the processor 410, and may be implemented by a single chip.

The storage medium 420 may include Random Access Memory (RAM), and may also include Read-Only Memory (ROM). Optionally, the storage medium 420 includes a non-transitory computer-readable storage medium. The storage medium 420 may be used to store instructions, programs, codes, code sets, or instruction sets. The storage medium 420 may include a storage program area and a storage data area, where the storage program area may store instructions for implementing an operating system, instructions for at least one function (such as a touch function, a sound playback function, an image playback function, etc.), Instructions for implementing the following method embodiments; the storage data area may store data (such as audio data, phonebook) created according to the use of terminal 400.

Taking the operating system of an Android system as an example, the programs and data stored in the storage medium 420 are shown in FIG. 7. The storage medium 420 stores a Linux kernel layer 421, a system runtime layer 422, an application framework layer 423, and an application layer 424. The Linus kernel layer 421 provides low-level drivers for various hardware of the terminal 400, such as display drivers, audio drivers, camera drivers, Bluetooth drivers, Wi-Fi drivers, power management, and so on. The system runtime layer 422 provides major feature support for the Android system through some C/C++ libraries. For example, the SQLite library provides database support, the OpenGL/ES library provides 3D drawing support, and the Webkit library provides browser kernel support. The Android runtime library is also provided in the system runtime layer 422, which mainly provides some core libraries for allowing developers to write Android applications using the Java language. The application framework layer 423 provides various APIs that may be used when building applications. Developers can also use these APIs to build their own applications, such as activity management, window management, view management, notification management, content providers, package management, call management, resource management, and location management. There is at least one application running in the application layer 424. These applications can be contact programs, SMS programs, clock programs, camera applications, etc. that are native to the operating system; they can also be applications developed by third-party developers, such as instant communication programs, photo beautification programs, etc.

Taking the operating system of an IOS system as an example, the programs and data stored in the storage medium 420 are shown in FIG. 8. The IOS system includes: a core operating system layer 520, a core service layer 540, a media layer 560, and a touchable layer 580. The core operating system layer 520 includes an operating system kernel, drivers, and a low-level program framework. These low-level program frameworks provide functions closer to the hardware for use by the program framework located at the core service layer 540. The core service layer 540 provides system services and/or program frameworks required by the application program, such as a foundation framework, an account framework, an advertising framework, a data storage framework, a network connection framework, a geographic location framework, a motion framework, and so on. The media layer 560 provides audio-visual-related interfaces for applications, such as interfaces related to graphics and images, interfaces related to audio technology, interfaces related to video technology, and wireless playback interfaces for audio and video transmission technologies. The touchable layer 580 provides various commonly-used interface-related frameworks for application development. The touchable layer 580 is responsible for user touch interactive operations on the terminal 400. For example, a local notification service, a remote push service, an advertising framework, a game tool framework, a message user interface framework, a user interface UIKit framework, a map framework, and so on.

Among the frameworks shown in FIG. 8, frameworks related to most applications include, but are not limited to:

a basic framework in a core service layer 540 and a UIKit framework in a touchable layer 580. The basic framework provides many basic object classes and data types, and provides the most basic system services for all applications, regardless of the UI. The classes provided by the UIKit framework are basic UI class libraries for creating touch-based user interfaces. IOS applications can provide UI based on the UIKit framework, so it provides the application's infrastructure for building user interfaces, drawing, handling and user interaction events, responding to gestures, and more.

The touch display screen 430 is used for receiving a touch operation by a user using a finger, a touch pen, or any suitable object on or nearby, and a user interface displaying various applications. The touch display screen 430 is usually disposed on the front panel of the terminal 400. The touch display screen 430 may be designed as a full screen, a curved screen or a special-shaped screen. The touch display screen 430 can also be designed as a combination of a full screen and a curved screen, and a combination of a special-shaped screen and a curved screen, which is not limited in this embodiments.

Full Screen

Figure 9:
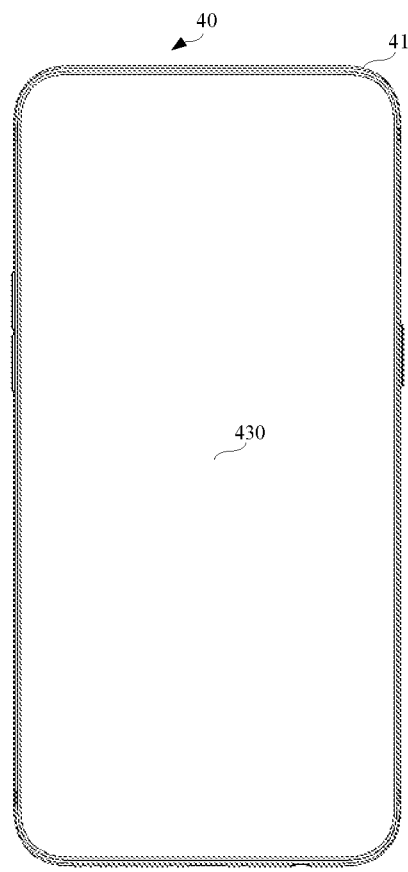
FIG. 9 is a schematic view of the interface of a full screen according to one embodiment of the present disclosure.

The full screen may refer to a screen design in which the touch screen display 430 occupies the front panel of the terminal 400 with a screen ratio exceeding a threshold (such as 80% or 90% or 95%). One calculation method of the screen ratio is: the area of the touch display screen 430/the area of the front panel of the terminal 400\*100%; another calculation method of the screen ratio is: the actual display area of the touch display screen 430 area/the area of the front panel of terminal 400\*100%; another way to calculate the screen ratio is: the diagonal of touch display 430/the diagonal of the front panel of terminal 400\*100%. In the schematic example shown in FIG. 9, almost all areas on the front panel of the terminal 400 are touch display screen 430. On the front panel 40 of the terminal 400, all areas other than the edges generated by the middle frame 41 are all touch display screen 430. The four corners of the touch display screen 430 may be right-angled or rounded.

The full screen may also be a screen design in which at least one front panel component is integrated inside or below the touch display screen 430. Optionally, the at least one front panel component includes a camera, a fingerprint sensor, a proximity light sensor, a distance sensor, and the like. In some embodiments, other components on the front panel of the traditional terminal are integrated in all or part of the touch display screen 430. For example, after the photosensitive element in the camera is split into multiple photosensitive pixels, the pixels are integrated in a black area in each display pixel in the touch display screen 430. Since at least one front panel component is integrated inside the touch display screen 430, the full screen has a higher screen ratio.

Of course, in other embodiments, the front panel components on the front panel of the traditional terminal can also be set on the side or back of the terminal 400, such as placing an ultrasonic fingerprint sensor under the touch display screen 430, or a bone-conducting earpiece inside the terminal 400, and the camera arranged on the side of the terminal in a pluggable structure.

In some optional embodiments, when the terminal 400 uses a full screen, a single side of the middle frame of the terminal 400, or two sides (such as left and right sides), or four sides (such as top, bottom, left, and right sides) are provided with edge touch sensors. The edge touch sensors are used to detect at least one of a user's touch operation, click operation, press operation, and slide operation on the middle frame. The edge touch sensor may be any one of a touch sensor, a thermal sensor, and a pressure sensor. The user can apply operations on the edge touch sensor to control applications in the terminal 400.

Curved Screen

Figure 10:
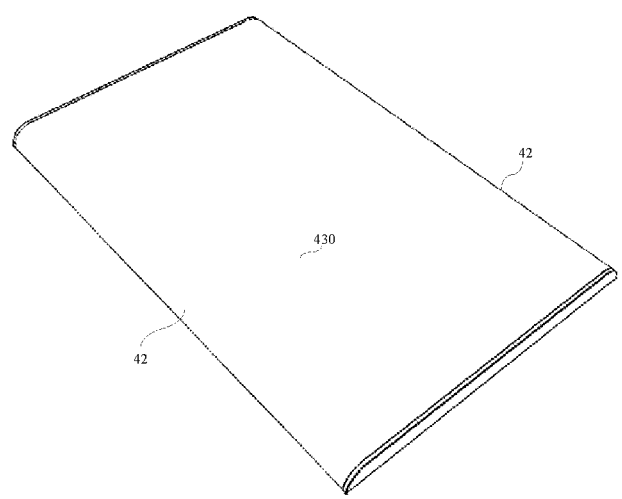
FIG. 10 is a schematic view of the interface of a curved screen according to one embodiment of the present disclosure.

The curved screen refers to a screen design in which the screen area of the touch display screen 430 is not in a plane. Generally, a curved screen has at least one cross section: the cross section has a curved shape, and the projection of the curved screen in any plane direction perpendicular to the cross section is a flat screen design. The curved shape may be U-shaped. Optionally, the curved screen refers to a screen design manner in which at least one side is a curved shape. Optionally, the curved screen refers to that at least one side of the touch display screen 430 extends to cover the middle frame of the terminal 400. Since the side of the touch display screen 430 extends to the middle frame of the terminal 400, the middle frame without the display function and the touch function is also covered as a displayable area and/or an operable area, so that the curved screen has a higher screen ratio. Optionally, in the example shown in FIG. 10, the curved screen refers to a screen design in which the left and right sides 42 are curved; or, the curved screen refers to a screen design in which the upper and lower sides are curved; or, curved screen refers to a screen design with four curved sides on the top, bottom, left, and right. In an alternative embodiment, the curved screen is made of a touch screen material with a certain flexibility.

Shaped Screen

The special-shaped screen is a touch display screen with an irregular appearance. The irregular shape is not a rectangle or a rounded rectangle. Optionally, the special-shaped screen refers to a screen design provided with protrusions, notches, and/or holes on the rectangular or rounded rectangular touch display screen 430. Optionally, the protrusion, the notch and/or the hole can be located at the edge of the touch display screen 430, the center of the screen, or both. When the protrusion, notch and/or hole is set on one edge, it can be set at the middle position or both ends of the edge; when the protrusion, notch and/or hole is set on the center of the screen, it can be set in one or more of the regions: the region above the screen, the upper left region, the left region, the lower left region, the lower region, the lower right region, the right region, and the upper right region. When arranged in multiple regions, the protrusions, notches and digging holes can be distributed in a centralized or distributed manner; they can be distributed symmetrically or asymmetrically. Optionally, the number of the protrusions, notches and/or dig holes is not limited.

The special-shaped screen covers the upper and/or lower forehead area of the touch display screen as a displayable area and/or an operable area, so that the touch-screen display takes up more space on the front panel of the terminal, having a larger screen ratio. In some embodiments, the notches and/or holes are used to receive at least one front panel component, which includes at least one of a camera, fingerprint sensor, proximity light sensor, distance sensor, handset, ambient light sensor, or physical buttons.

Figure 11:
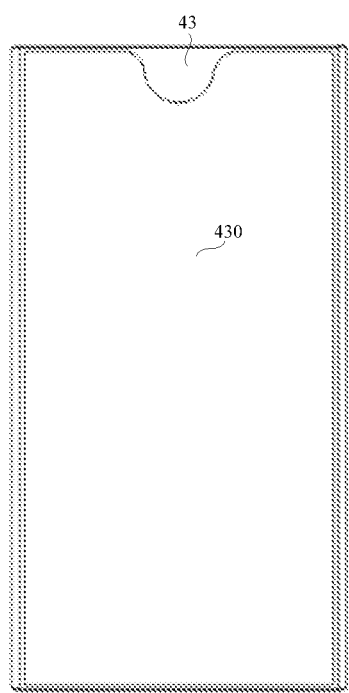
FIG. 11 is a schematic view of the interface of a shaped screen according to one embodiment of the present disclosure.
Figure 12:
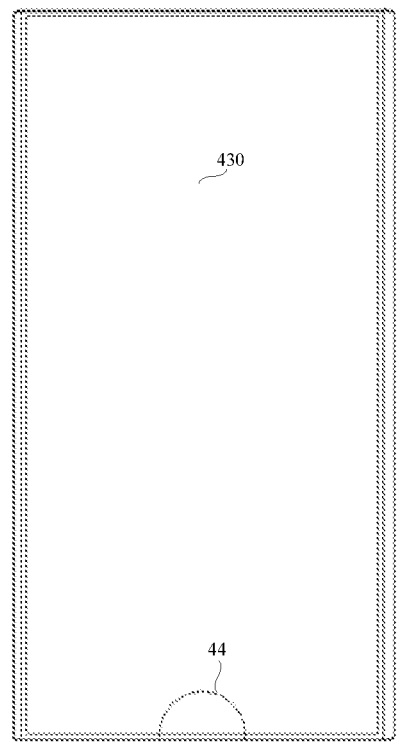
FIG. 12 is a schematic view of the interface of another shaped screen according to one embodiment of the present disclosure.
Figure 13:
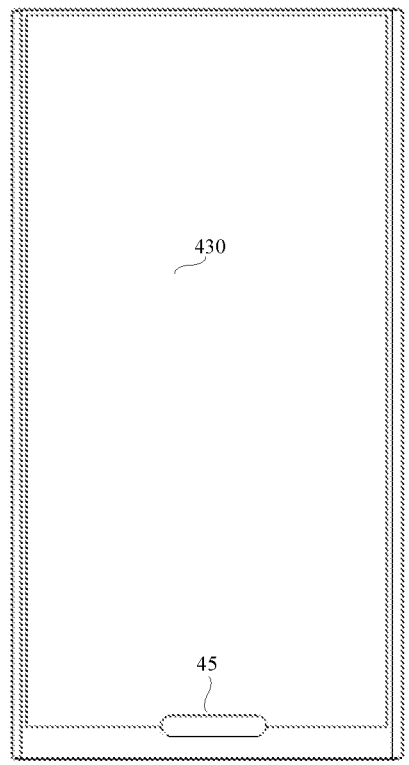
FIG. 13 is a schematic view of the interface of another shaped screen according to one embodiment of the present disclosure.
Figure 14:
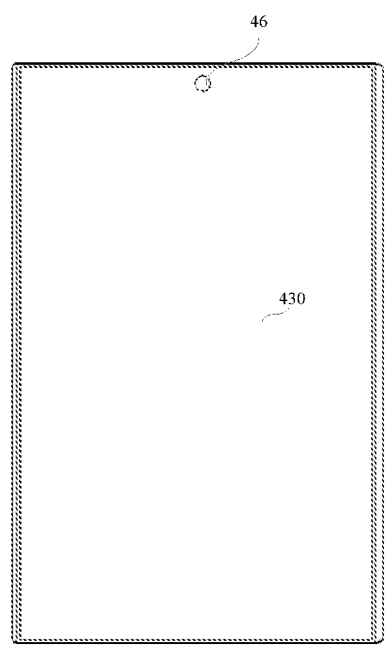
FIG. 14 is a schematic view of the interface of another shaped screen according to one embodiment of the present disclosure.

For illustration, the notch may be provided on one or more edges, and the notch may be a semi-circular notch, a right-angled rectangular notch, a rounded rectangular notch, or an irregularly-shaped notch. In the example shown schematically in FIG. 11, the special-shaped screen may be a screen design provided with a semi-circular notch 43 at the center of the upper edge of the touch display screen 430. The space vacated by the semi-circular notch 43 is used for accommodating at least one front panel component of a camera, a distance sensor (also known as a proximity sensor), a handset, and an ambient light brightness sensor. As shown schematically in FIG. 12, the special-shaped screen may be on the lower edge of the touch display 430 the central position is provided with a screen design of a semi-circular notch 44. The space vacated by the semi-circular notch 44 is used to accommodate at least one component of a physical button, a fingerprint sensor, and a microphone. As shown schematically in the example of FIG. 13, the special-shaped screen may be a screen design provided with a semi-elliptical notch 45 in the center of the lower edge of the touch display 430. A semi-elliptical notch is formed on the front panel of the terminal 400, and two semi-elliptical notches surround to form an elliptical area. The elliptical area is used to accommodate physical keys or fingerprint identification modules. In the example shown schematically in FIG. 14, the shaped screen can be a screen design having at least one small hole 45 in the upper half of the touch display 430, and the space vacated by the small hole 45 is used to accommodate at least one front panel component of a camera, a distance sensor, a handset, and an ambient light sensor.

In addition, those skilled in the art can understand that the structure of the terminal 400 shown in the above drawings does not constitute a limitation on the terminal 400. The terminal may include more or fewer components than shown in the drawings, or combine certain components, or different component arrangements. For example, the terminal 400 further includes components such as a radio frequency circuit, an input unit, a sensor, an audio circuit, a WIFI module, a power supply, and a Bluetooth module, and details are not described herein again.

A non-transitory computer-readable storage medium, when instructions in the storage medium are executed by a processor of a mobile terminal, enable the mobile terminal to execute the fingerprint identification method shown in FIG. 1 or FIG. 2.

A computer program product containing instructions that, when run on a computer, causes the computer to execute the fingerprint identification method shown in FIG. 1 or FIG. 2 described above.

The various embodiments can be implemented, in part or as a whole, by software, hardware or the combinations thereof. The foregoing methods can be performed by modules embedded in or independent from a processor of a base station and in the form of hardware, or be stored in a memory of a base station and in the form of software, so as to facilitate the processor to call and execute corresponding steps of the foregoing various modules. The processor can be a central processing unit (CPU), a microprocessor, a micro-controller unit, and so on.

A person skilled in the art should understand that the processes of the methods in the above embodiments can be, in full or in part, implemented by computer programs instructing underlying hardware, the programs can be stored in a non-volatile computer-readable storage medium, the program can include the processes in the embodiments of the various methods when it is being executed. The storage medium can be a disk, a CD, a Read-Only Memory (ROM).

Although the respective embodiments have been described one by one, it shall be appreciated that the respective embodiments will not be isolated. Those skilled in the art can apparently appreciate upon reading the disclosure of the application that the respective technical features involved in the respective embodiments can be combined arbitrarily between the respective embodiments as long as they have no collision with each other.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method for fingerprint identification, applied to a terminal, comprising:
  in response to detecting a touch operation on a specified application icon, obtaining fingerprint information corresponding to the touch operation, the touch operation being for decrypting an application corresponding to the specified application icon;
  transmitting the fingerprint information to the application;
  in response to determining that the fingerprint information matches a pre-stored valid fingerprint information, determining, by the application, that the fingerprint information passes a safety authentication;
  in response to determining that the fingerprint information does not match the pre-stored valid fingerprint information, determining, by the application, that the fingerprint information does not pass the safety authentication;
  in response to determining that the fingerprint information passes the safety authentication, the application entering an application display interface;
  in response to determining that the fingerprint information does not pass the safety authentication, calculating, by the application, the authentication failure times, the authentication failure times being the count of consecutive fingerprint authentication failures;
  in response to determining that the authentication failure times reaches a preset count, blocking the specified application icon;
  detecting a screen unlock operation when the terminal is locked and passing a screen unlock command to the application; and
  in response to detecting the screen unlock command by the application, restoring displaying, by the application, the specified application icon.

2. The method according to claim 1, further comprising:
  after the application determines that the fingerprint information does not pass the safety authentication, the application shaking the specified application icon at a preset frequency, and displaying a fingerprint entry prompt message on the specified application icon, the fingerprint entry prompt message being configured to notify a user to re-enter the fingerprint information.

3. The method according to claim 1, wherein a fingerprint sensor is provided below a display screen of the terminal, and wherein obtaining fingerprint information corresponding to the touch operation comprises:
  launching the fingerprint sensor at the icon display area of the specified application icon; and
  obtaining, by the fingerprint sensor, the fingerprint information corresponding to the touch operation.

4. The method according to claim 1, wherein in response to detecting a touch operation on a specified application icon, obtaining fingerprint information corresponding to the touch operation comprises:

displaying a specified operation icon, the specified operation icon being configured to, upon being triggered, instruct the terminal to perform a specified operation, the specified operation icon corresponding to the specified operation, the specified operation being a function of an application corresponding to the specified application icon;

in response to detecting the touch operation on the specified operation icon, obtaining the fingerprint information corresponding to the touch operation.

5. The method according to claim 4, wherein displaying the specified operation icon comprises:

displaying the specified operation icon in a desktop interface of the terminal;

or, displaying the specified operation icon in a notification bar of the terminal;

or, displaying the specified operation icon in a navigation bar of the terminal.

6. The method according to claim 1, further comprising:

when the terminal is in a state of screen on and locked, displaying the specified application icon in a user interface;

performing the step of responding to detecting the touch operation on the specified application icon, obtaining fingerprint information corresponding to the touch operation.

7. A mobile terminal, comprising a storage medium, a processor, and computer instructions stored in the storage medium and executable by the processor, wherein the processor is configured to perform:

in response to detecting a touch operation on a specified application icon, obtaining fingerprint information corresponding to the touch operation, the touch operation being for decrypting an application corresponding to the specified application icon;

transmitting the fingerprint information to the application;

in response to determining that the fingerprint information matches a pre-stored valid fingerprint information, determining, by the application, that the fingerprint information passes a safety authentication;

in response to determining that the fingerprint information does not match the pre-stored valid fingerprint information, determining, by the application, that the fingerprint information does not pass the safety authentication;

in response to determining that the fingerprint information passes the safety authentication, the application entering an application display interface;

in response to determining that the fingerprint information does not pass the safety authentication, calculating, by the application, the authentication failure times, the authentication failure times being the count of consecutive fingerprint authentication failures;

in response to determining that the authentication failure times reaches a preset count, blocking the specified application icon;

detecting a screen unlock operation when the terminal is locked and passing a screen unlock command to the application; and in response to detecting the screen unlock command by the application, restoring displaying, by the application, the specified application icon.

8. The mobile terminal of claim 7, wherein in terms of in response to detecting a touch operation on a specified application icon, obtaining fingerprint information corresponding to the touch operation, the processor is configured to perform:

displaying a specified operation icon, the specified operation icon being configured to, upon being triggered, instruct the terminal to perform a specified operation, the specified operation icon corresponding to the specified operation, the specified operation being a function of an application corresponding to the specified application icon;

in response to detecting the touch operation on the specified operation icon, obtaining the fingerprint information corresponding to the touch operation.

9. The mobile terminal of claim 8, wherein in terms of displaying the specified operation icon, the processor is configured to perform:

displaying the specified operation icon in a desktop interface of the terminal;

or, displaying the specified operation icon in a notification bar of the terminal;

or, displaying the specified operation icon in a navigation bar of the terminal.

10. A non-transitory computer-readable storage medium, the non-transitory computer-readable storage medium storing instructions, when executed by a computer, cause the computer to perform:

in response to detecting a touch operation on a specified application icon, obtaining fingerprint information corresponding to the touch operation, the touch operation being for decrypting an application corresponding to the specified application icon;

transmitting the fingerprint information to the application;

in response to determining that the fingerprint information matches a pre-stored valid fingerprint information, determining, by the application, that the fingerprint information passes a safety authentication;

in response to determining that the fingerprint information does not match the pre-stored valid fingerprint information, determining, by the application, that the fingerprint information does not pass the safety authentication;

in response to determining that the fingerprint information passes the safety authentication, the application entering an application display interface;

in response to determining that the fingerprint information does not pass the safety authentication, calculating, by the application, the authentication failure times, the authentication failure times being the count of consecutive fingerprint authentication failures;

in response to determining that the authentication failure times reaches a preset count, blocking the specified application icon;

detecting a screen unlock operation when the terminal is locked and passing a screen unlock command to the application; and in response to detecting the screen unlock command by the application, restoring displaying, by the application, the specified application icon.

11. The non-transitory computer-readable storage medium of claim 10, wherein in terms of in response to detecting a touch operation on a specified application icon, obtaining fingerprint information corresponding to the touch operation, the non-transitory computer-readable storage medium storing instructions, when executed by the computer, cause the computer to perform:

displaying a specified operation icon, the specified operation icon being configured to, upon being triggered, instruct the terminal to perform a specified operation, the specified operation icon corresponding to the specified operation, the specified operation being a function of an application corresponding to the specified application icon;

in response to detecting the touch operation on the specified operation icon, obtaining the fingerprint information corresponding to the touch operation.

12. The non-transitory computer-readable storage medium of claim 11, wherein in terms of displaying the specified operation icon, the non-transitory computer-readable storage medium storing instructions, when executed by the computer, cause the computer to perform:

displaying the specified operation icon in a desktop interface of the terminal;

or, displaying the specified operation icon in a notification bar of the terminal;

or, displaying the specified operation icon in a navigation bar of the terminal.

\* \* \* \* \*